Jan. 16, 1962 B. A. FULTON 3,016,750
STRUT ANGLE GAUGE
Original Filed Nov. 7, 1955 3 Sheets-Sheet 1

Inventor:
Bertram A. Fulton
By:
Frank R. Thienpont
Atty.

Jan. 16, 1962  B. A. FULTON  3,016,750
STRUT ANGLE GAUGE
Original Filed Nov. 7, 1955  3 Sheets-Sheet 2
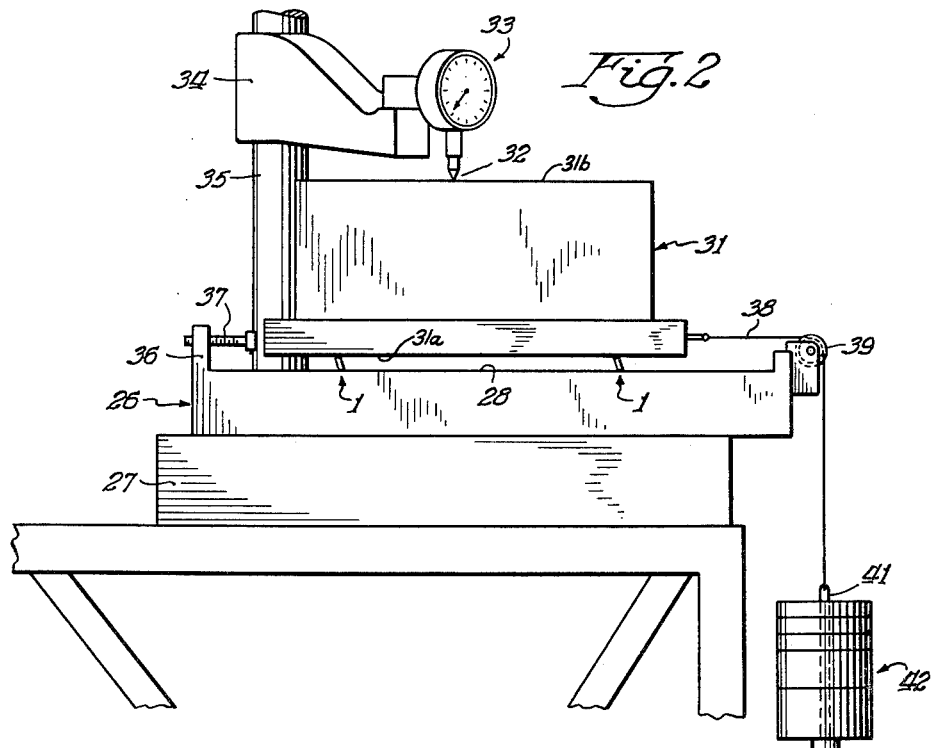
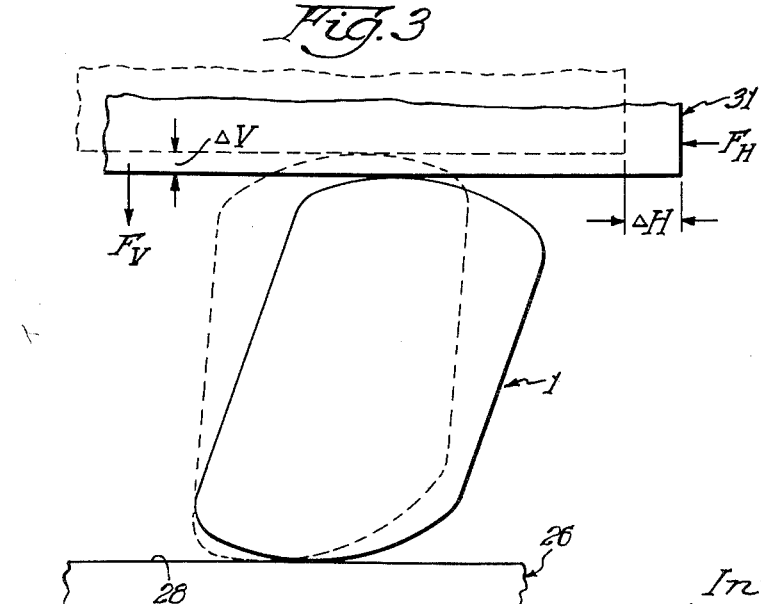
Inventor:
Bertram A. Fulton
By:
Frank R. Skienport Atty.

Jan. 16, 1962 B. A. FULTON 3,016,750
STRUT ANGLE GAUGE
Original Filed Nov. 7, 1955 3 Sheets-Sheet 3
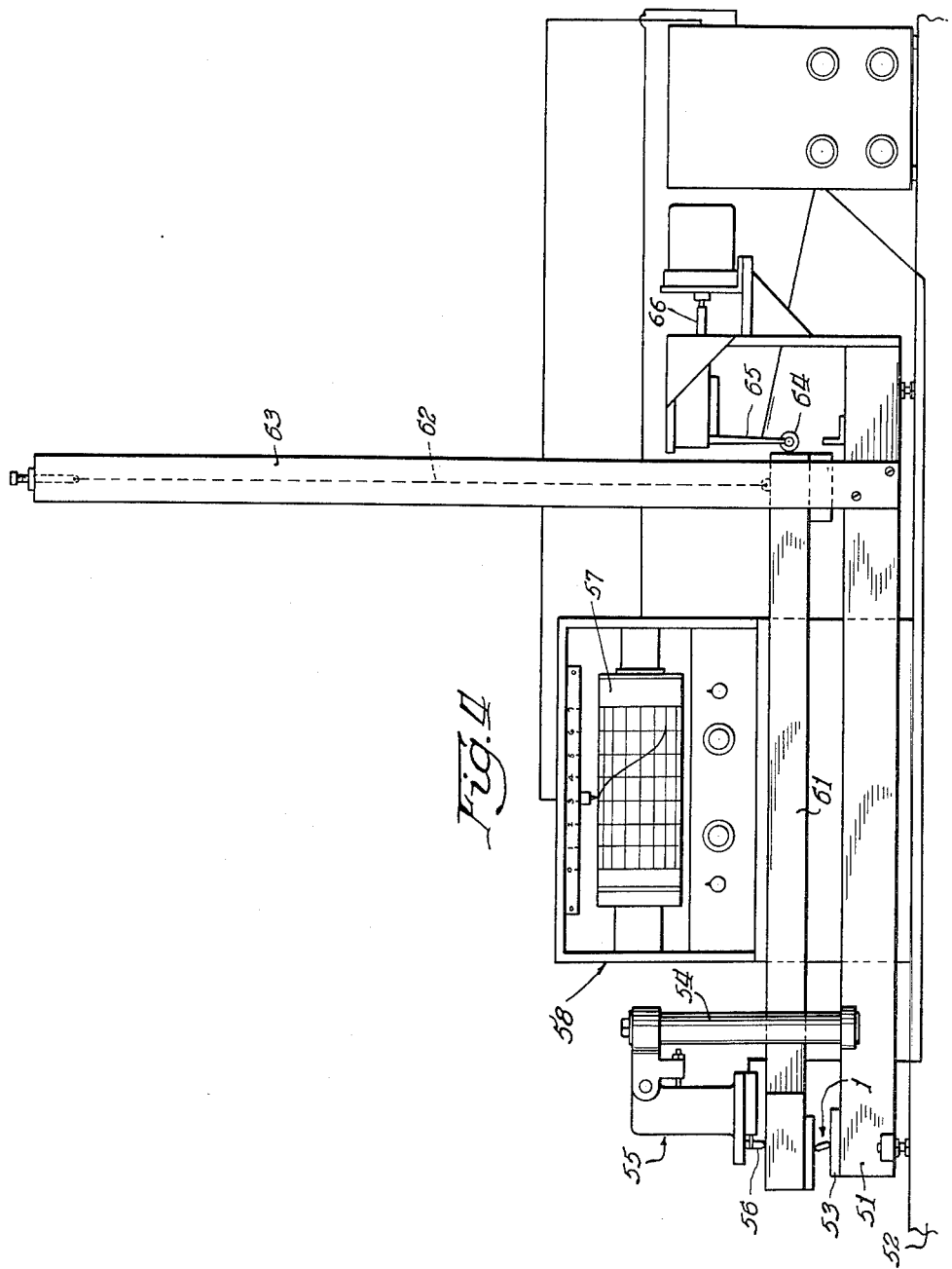
Inventor:
Bertram A. Fulton
By: Frank R. Thienpont
Atty.

United States Patent Office 3,016,750
Patented Jan. 16, 1962

3,016,750
STRUT ANGLE GAUGE
Bertram A. Fulton, Lynnfield, Mass., assignor to Borg-Warner Corporation, Chicago, Ill., a corporation of Illinois
Continuation of application Ser. No. 545,416, Nov. 7, 1955. This application July 18, 1960, Ser. No. 43,655
10 Claims. (Cl. 73—432)

The present invention relates to a cam measuring mechanism, and more particularly, to gauge means for determining the strut angle of a sprag of the type employed in a one-way engaging device. This application is a continuation of my co-pending application Serial No. 545,416, filed November 7, 1955.

In a one-way engaging device of the type employing a plurality of sprags or other gripping members of the type in which such sprags comprise radially spaced and eccentrically curved race engaging surfaces, it is essential both during the basic formulation of the device and during subsequent tests to determine the operating characteristics thereof to determine with accuracy the strut angle of the sprags employed, and how such strut angle changes with the tilting movement of the sprags. Most specifically, it is common practice to employ one-way engaging devices of the type having a pair of races each of which is provided with a smooth sprag engaging surface, these race surfaces being radially spaced and providing a circular opening therebetween. Within such circular opening there are disposed a plurality of peripherally spaced sprags, each of which has a pair of radially spaced, eccentrically curved race engaging surfaces so constructed and arranged that as the sprags tilt they present a varying radial dimension between the race surfaces. The races, may, therefore, rotate relatively in one direction, but are effectively connected together by the sprags upon attempted relative rotation in the opposite direction. It is essential in the manufacturing and testing of such devices to be able to determine readily the strut angle of these sprags as they tilt throughout their operating range.

It is therefore one object of the present invention to provide a gauge for readily determining the strut angle of sprags.

Another object is the provision of a measuring device in accordance with the preceding object in which the strut angle may be measured either manually or automatically.

Other objects and features of the invention will be readily apparent to those skilled in the art from the specification and appended drawing illustrating certain preferred embodiments in which:

FIGURE 2 is a measuring device in accordance with the present invention adapted to determine the strut angle of sprags;

FIGURE 3 is a diagrammatic representation of a sprag being measured in the device of the present invention;

FIGURE 4 is an improved measuring mechanism according to the present invention having automatic means for plotting the measured sprag criteria.

Figure 1:
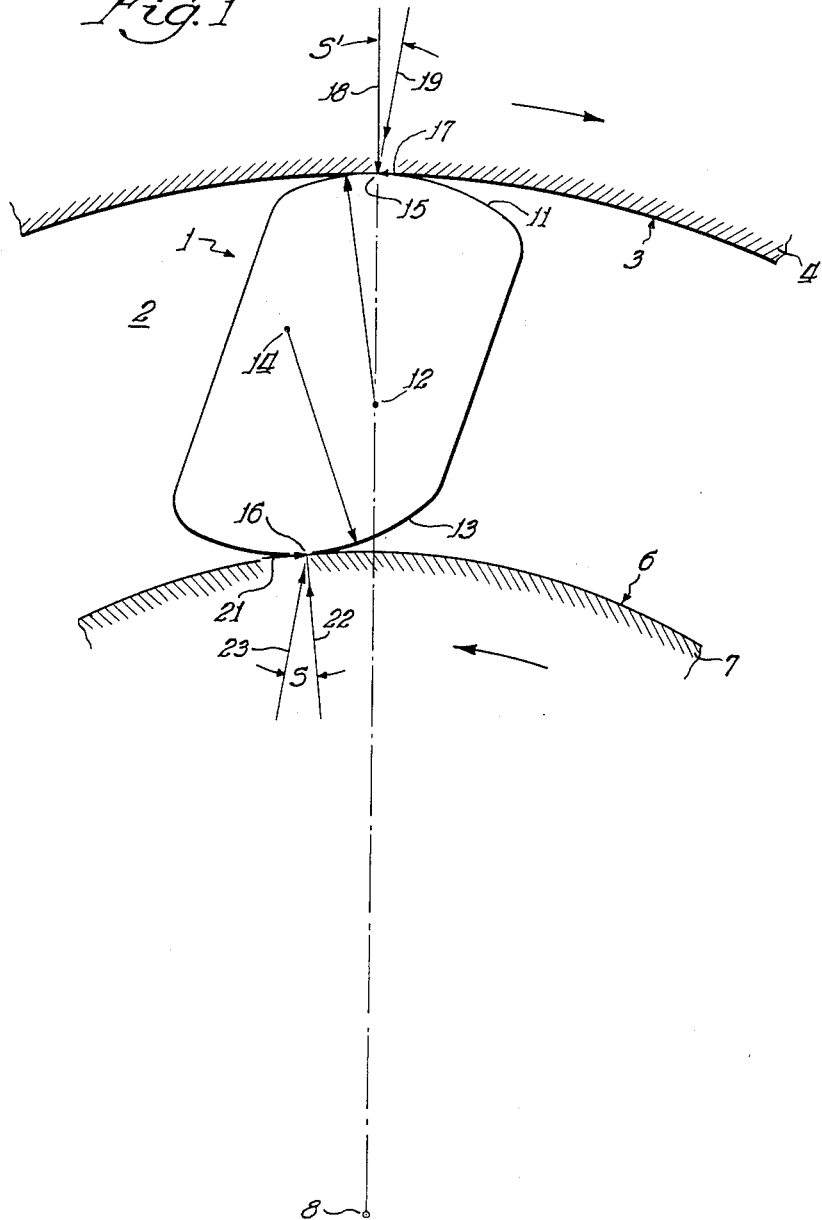
FIGURE 1 illustrates a typical sprag disposed between typical race surfaces, shown only fragmentarily.

FIGURE 1 illustrates a sprag, indicated in general by the numeral 1, disposed within a generally annular opening 2 defined by an outer race surface 3, on an outer race 4, and an inner race surface 6, forming a part of an inner race 7. The races 4 and 7 are adapted for rotation about a common center 8.

The sprag 1 has an outer race engaging surface 11 which is curved about a center 12 within the sprag. The sprag 1 further has an inner race engaging surface 13 which is curved about a center 14, also within the sprag. It will, therefore, be seen that the surfaces 11 and 13 will cause a variable radial dimension of the sprag 1 to be presented to the surfaces 3 and 6 as the sprag 1 tilts throughout its operating range. As a result, when the races rotate in the relative direction indicated by the curved arrows on FIGURE 1, the sprags will permit such rotation; when the races rotate in the opposite direction, the sprags 1 will tilt to a wedging position between the surfaces 3 and 6 and couple the races together for unitary rotation.

The outer curved surface 11 of sprag 1 contacts the outer race surface 3 along a line 15 (one end of which is illustrated as a point in FIGURE 1); the inner curved surface 13 engages the inner race surface 6 along a line 16 (also illustrated as a point in FIGURE 1). Along line 15 there will be acting a horizontal force—indicated by the arrow numbered 17—and a vertical force—indicated by the arrow 18—and it is obvious that these forces may be resolved into the force indicated by the arrow 19. At the inner race surface, a horizontal force represented by the line 21 acts upon the sprag along the line 16, and a vertical force 22 also acts along the line 16, these forces represented by the lines 21 and 22 being resolved into the force 23. It will be obvious that the forces represented by the lines 19 and 23 are equal and oppositely directed.

The angle S between the vertical force 22 and the resultant force 23 is the "inner race strut angle," and the tangent of this angle is equal to the horizontal force 21 divided by vertical force 22. It is extremely important to know this strut angle inasmuch as the sprag will slip if the strut angle is excessive, or in other words, is greater than the coefficient of friction for these materials; in addition, the radial force of the sprags on the races is inversely proportional to the strut angle, so that for any given torque, the strut angle should not be too minute due to the fact that the radial force by the sprags on the races may then become excessive.

It will be seen that at the outer race in FIGURE 1, the "outer race strut angle S'" is formed by the vertical force 18 and the resultant force 19, the angle S' differing slightly from the angle S—previously defined as the inner race strut angle. In the following discussion, only the strut angle S will be discussed, inasmuch as it has been determined experimentally that this angle at the inner race is always the higher, and that clutch slippage is obviated by the proper control over this angle. It will be obvious that such control is effected by controlling the curvature of the surfaces 11 and 13.

The foregoing discussion has been based upon an assumption that the sprag 1 retains the position illustrated in FIGURE 1; as the sprag 1 tilts, however, through its operating range the strut angle will change. The device of the present invention provides for not only measuring the strut angle in one particular position, but in addition provides for measuring strut angle as the sprag tilts throughout its operating range.

One embodiment of the present invention for accomplishing the foregoing purpose is illustrated in FIGURE 2. The device comprises a base member 26 mounted upon a suitable platform 27, the base member 26 having a flat upper surface 28 which is arranged so as to be horizontal. Disposed in engagement with the surface 28 are spaced sprags 1, parallel to each other. On the sprags 1 rests a weight member 31, the lower, flat surface 31a of which contacts the sprags, and the upper flat surface 31b of which is in contact with a pointer 32 of a suitable instrument 33 having indicia thereon for indicating movement of the pointer 32. The instrument 33 is mounted upon a suitable arm 34 carried by a post 35, rigidly connected to the base 26.

The base 26 has at one end thereof an upstanding arm 36, provided with a threaded opening through which extends an adjustable stop comprising a bolt 37, the inner end of which is adapted to limit movement of the member 31 to the left. The right side of the member 31, in the view of FIGURE 2, is connected to a cord 38 which is disposed over a pulley 39 attached to the platform 26. The opposite end of the cord 38 is attached to a suitable generally T-shaped carrier 41 on which are disposed a plurality of individual weight units, indicated collectively by the numeral 42.

Referring now to FIGURE 3, it will be seen that the member 31 applies a "downward" force $F_V$—due to its weight—to the sprags 1. As member 31 has applied thereto a "horizontal" force $F_H$ by the cord 38 sufficient to effect the movement of the member 31 through a distance delta H, the member 31 will be raised—by virtue of the tilting movement of the sprag 1—an amount delta V. In raising the member 31, it acquires increased potential energy equal to its weight $F_V \times$ the change in height thereof (delta V). This increase in energy obviously must come from the horizontal force $F_H$, and the work done by this force in effecting the increase in potential energy is equal to the force $F_H \times$ the distance delta H. Neglecting the small amount of energy used up in rolling friction, the work done equals the increase in energy or $F_V \times$ delta V equals $F_H \times$ delta H. From the foregoing equation, it will be seen that delta V divided by delta H equals $F_H$ divided by $F_V$, which in turn is equal numerically to the tangent of the strut angle. In this regard it should be kept in mind that this strut angle will always be very small, and desirably no greater than 7 degrees; as a result, the rate of change in the tangent of the angle and the rate of change of the angle are substantially identical.

Inasmuch as delta V is the amount the sprag departs from a cylinder over the distance delta H, then delta V divided by delta H gives the rate at which the sprag departs from a cylinder. In other words, the tangent of the strut angle is substantially the same thing as the rate at which the sprag departs from a cylinder. This may readily be determined with the device of the present invention inasmuch as $F_V$, which is the weight of the member 31, is a fixed and known quantity. It is only necessary, therefore, to measure $F_H$ to determine the ratio of delta V divided by delta H, or the tangent of the strut angle.

Concerning now the embodiment of the invention illustrated in FIGURE 2, the operation thereof will now be explained. Initially, suitable means—such as rollers—(not shown) are placed upon the surface 28 and the weight member 31 is placed thereon. The instrument 33 is then adjusted to indicate a "zeroed" condition. A pair of sprags 1 is then placed upon the surface 28 beneath the weight member 31, the sprags 1 being positioned parallel to each other. The sprags are then tilted until the weight member 31 is lifted slightly off of the rollers, which are then withdrawn from the structure. The sprags 1, engaging both the surface 28 and the surface 31a, are then permitted to tilt in a counterclockwise direction—in the view of FIGURE 2—until the weight member 31 engages the adjustable stop 37. The stop 37 is then positioned as desired until the instrument 33 indicates a predetermined, desired "sprag height" which may be defined as the space between the race surfaces (simulated by the surfaces 28 and 31a) measured in a direction perpendicular to both of the surfaces. A plurality of weight means 42 are then individually added to the holder 41 so that the weight member 31 will be incrementally pulled away from the adjustable stop 37, as indicated in FIGURE 2. As each weight is added, member 31 is moved an additional amount away from stop 37 and will be moved vertically an additional amount in view of the eccentrically curved race engaging surfaces or the sprags; a graph is thereby plotted as each weight is added using the weight along one axis and the sprag height (as indicated by the instrument 33) along the other axis. As previously explained, any particular point along the graph will show the tangent of the strut angle for the particular corresponding sprag height. The individual weights are intermittently added to the holder 41 until member 31 has been moved to such a degree that the sprags 1 have been tilted throughout their normal tilting range, and thereafter throughout their maximum tilting range.

In one mechanism constructed in accordance with the present invention the value of $F_V$ was fixed at 6,000 grams, and the value of $F_H$ was varied in 3 gram increments by adding weights 42 to the holder 41. This permitted departures from the cylindrical to the measured within 1 part in 2,000. Thus in a thousandths of an inch circumference along the race engaging surfaces of the sprag, the change in height of the sprag could be measured within one-half millionth of an inch.

In FIGURE 4 there is shown an improved version of the device of the present invention which comprises an elongated base 51 mounted upon a fixed platform 52 by suitable leveling mechanisms. The base 51 has a raised, flat block 53 thereon, upon the inner surface of which is disposed a sprag 1 to be measured. The base 51 also carries a post 54 which supports a suitable measuring mechanism 55 having a movable pointer 56, the movement of the pointer being transcribed upon a chart 57 of a recording device 58 by virtue of conventional electrical connections thereto.

Disposed between the sprag 1 and the movable pointer 56 is a "floating" vertical force member 61 which comprises a rectangular bar having one end disposed between the sprag and pointer, the opposite end being supported by an elongated cord 62 which is attached to and carried by an elongated support 63 mounted upon the base 51. The length of the cord 62 is such that—for practical purposes—it applies no horizontal force to member 61 throughout the tilting range of the sprag. In engagement with the right end of the member 61 is a roller 64 rotatably disposed at one end of a force gauge 65. Suitable conventional means 66 are provided for gradually increasing or decreasing the force applied by the roller 64 to the right end of the member 61, and other conventional means are provided for electrically recording upon the device 58 the force measured by the force gauge 65. As a result, the measuring device 58 will record a graph of the force $F_H$ (see FIGURE 3) plotted simultaneously against the increase or decrease in the height of the left end of member 61, or the increase or decrease in the "sprag height." As a result a point on the graph will show the horizontal force applied, (which is proportional for practical purposes to the strut angle as previously described) for a particular sprag height or radial space between the races. This gives an accurate, continuous indication of the strut angle of the sprag throughout its entire tilt range.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. In a cam measuring gauge, the combination comprising a base member adapted to support a cam, means to apply a vertical force to the cam, means supporting said vertical force applying means for substantially frictionless horizontal movement, means for applying a horizontal force to said vertical force applying means, and means to indicate the magnitude of at least one of said forces.

2. In a sprag strut angle gauge, the combination comprising a base member adapted to support a sprag, means to apply a vertical force to the sprag, means supporting said vertical force applying means for substantially frictionless horizontal movement, means for applying a horizontal force to said vertical force applying means, whereby the sprag may be tilted, means to indicate the magnitude of said horizontal force, and means to indicate the degree of vertical movement of said vertical force applying member as the sprag is tilted.

3. In a device for measuring the strut angle of a tiltable gripper of the type having curved race engaging surfaces respectively adapted to present a varying dimension between the race surfaces as the tiltable gripper is tilted comprising a horizontal base member adapted to support a curved surface of a tiltable gripper, vertical force applying means adapted to be supported upon another surface of the tiltable gripper, means to apply a horizontal force to said vertical force applying means whereby the sprag will be tilted, and means to indicate the magnitude of at least one of said forces.

4. In a device for measuring the strut angle of a tiltable gripper of the type having curved race engaging surfaces respectively adapted to present a varying dimension between the race surfaces as the tiltable gripper is tilted comprising a horizontal base member adapted to support a tiltable gripper, vertical force applying means adapted to be supported upon a curved surface of the tiltable gripper, means to apply a horizontal force to said vertical force applying means whereby the sprag will be tilted, means to indicate the magnitude of said horizontal force and means to indicate the degree of vertical movement of said vertical force applying member as the tiltable gripper is tilted.

5. The method of measuring the departure from circular of a cam comprising the steps of placing the cam between a pair of vertically spaced members with the opposite ends of said cam in engagement with both of said members, a known vertical force being applied by said upper member to said cam, applying a horizontal force to said upper member to effect horizontal movement thereof and consequent tilting movement of said cam, and measuring the vertical movement of said upper member induced by said cam tilting movement.

6. The method of measuring the departure from circular of a cam comprising the steps of placing the cam between a pair of vertically spaced members with the opposite ends of said cam in engagement with both of said members, a known vertical force being applied by said upper member to said cam, applying a plurality of sequential horizontal forces to said upper member to effect incremental horizontal movement thereof and consequent tilting movement of said cam, measuring the vertical movements of said upper member induced by said cam tilting movement, and forming a graph by plotting along one axis said vertical movements of said upper member and along another axis said horizontal forces.

7. The method of measuring the departure from circular of a cam, comprising the steps of placing the cam between a pair of spaced members with the opposite ends of said cam in frictional engagement with both of said members, maintaining said frictional engagement while moving one of said members in a first direction to effect a tilting movement of said cam by applying predetermined force to said one member, and measuring the movement of at least one of said members in a direction normal to said first direction induced by said cam tilting movement.

8. In a cam measuring gauge, the combination comprising a first and second means for engaging spaced portions of a cam of the type adapted to contact two race surfaces, means for applying a force to the cam to rotate the cam between said first and second means to effect a relative displacement between said first and second means, means for measuring the relative displacement between said first and second means as the cam is rotated.

9. In a cam measuring gauge, the combination comprising a first and second means for engaging spaced portions of a cam of the type adapted to contact two race surfaces, means for applying a force to the cam to rotate the cam between said first and second means to effect a relative displacement between said first and second means, and means for measuring the angular displacement of said cam.

10. In a cam measuring gauge for obtaining measurements relating to a cam of the type having at least one race engaging surface formed thereon, the combination comprising: a first means for supporting the cam, a second means adapted to contact the cam at a race engaging surface for applying a first force to the cam, a third means for applying a second force to the cam in a direction substantially at right angles to said first force to rotate the cam and means for measuring the relative displacement between said first and second means as the cam is rotated.

References Cited in the file of this patent

UNITED STATES PATENTS 2,728,144    Nilsson _____ Dec. 27, 1955